J. P. LAVIGNE.
VALVE.
APPLICATION FILED NOV. 19, 1913.
1,224,090.
Patented Apr. 24, 1917.
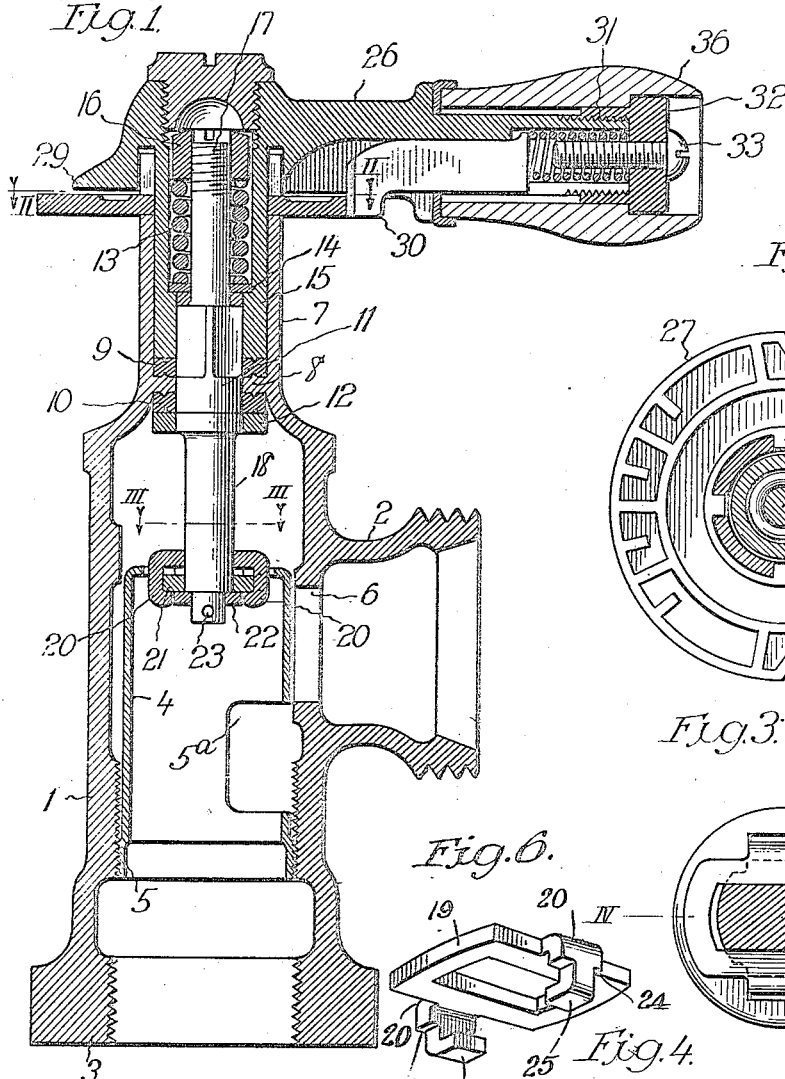
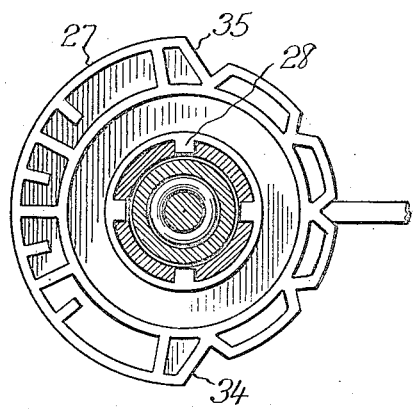
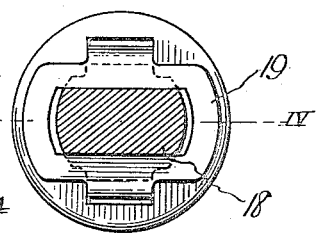
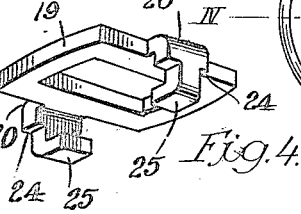
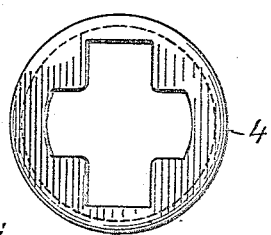
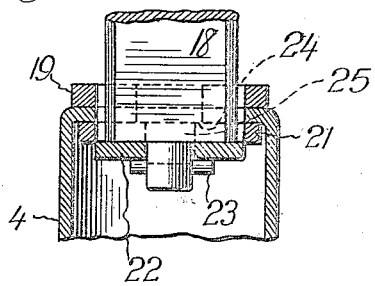
Witnesses:
L. E. Flanders
Genevieve E. McGrann
Inventor
Joseph P. Lavigne
By
Atty's

UNITED STATES PATENT OFFICE.

JOSEPH P. LAVIGNE, OF DETROIT, MICHIGAN.

VALVE.

1,224,090.            Specification of Letters Patent.      Patented Apr. 24, 1917.

Application filed November 19, 1913. Serial No. 801,764.

*To all whom it may concern:*

Be it known that I, JOSEPH P. LAVIGNE, a citizen of the United States of America, residing at Detroit, in the county of Wayne and State of Michigan, have invented certain new and useful Improvements in Valves, of which the following is a specification, reference being had therein to the accompanying drawings.

In the adjustment of valves and more particularly those adapted for use with steam radiators in heating systems, it is desirable that provision be made whereby one valve can be regulated to control one, two or more radiators and whereby after such regulation, the valve may be operated to supply the maximum and minimum amount of steam for the radiator or set of radiators for which it has been regulated.

This invention relates to valves and more especially to a construction thereof whereby a valve may be adjusted to have a capacity sufficient for one radiator or any preferred number of radiators or the like and whereby when once so adjusted it may be quickly manipulated. The invention also includes means for maintaining the parts in proper operative position and for compensating for slight irregularities incidental to the construction of valves of this type.

The invention consists in the matters hereinafter set forth and pointed out in the appended claims.

In the drawings,

Figure 1 is a view in longitudinal section of a valve that embodies features of the invention;

Fig. 2 is a view in transverse section taken on or about line II—II of Fig. 1;

Fig. 3 is a view in detail and in section taken on or about line III—III of Fig. 1.

Fig. 4 is a view taken on line IV—IV of Fig. 3;

Fig. 5 is a view in detail of the top of a sleeve closure, and

Fig. 6 is a perspective view of a plate forming part of my invention.

As herein indicated, a substantially cylindrical casing 1 has a lateral nipple 2, and is fitted at its open end portion 3 and the nipple for connection with pipes or couplings. A substantially cylindrical sleeve 4 has a lower slightly enlarged portion 5, that is in screwthreaded engagement with the interior of the casing adjacent the nipple 2 so that rotation of the sleeve brings a port 5 in the sleeve into more or less complete register with a lateral opening 6 between the ports of the casing and nipple.

A tubular bonnet 7, preferably formed integrally with the casing 1, has an interior flange 8 that forms oppositely disposed seats for an upper packing ring 9 and a lower packing ring 10 respectively. A valve stem has a cylindrical portion 11 rotatable in a guide aperture of the diaphragm 8 and a collar 12 that bears against the lower packing ring 10 under the influence of a spring 13. The latter is in compression between a washer 14 in the bottom of a recess of a hollow handle spindle 15 and a check nut 16 screwthreaded on to a reduced portion 17 of the stem 11. The stem itself is squared, splined or otherwise adapted for non-rotatable engagement with the spindle 15.

Connection between a squared or flattened portion 18 of the stem 11 and the closure 4 whereby the latter turns with the stem, is formed by a plate 19 non-rotatable and laterally movable on the stem that has depending ears 20 inbent or hooked under a plate 21. A washer 22 and pin 23 retain the parts 20 and 21 on the portion 18 of the stem. The plates and stem are so proportioned in relation to a guide opening shown in Fig. 5, in the head of the sleeve 4, that the plate 19 is free to move laterally a limited distance in relation to the sleeve 4 while the plate 21 and spindle portion 18 are movable in the plate 19 at right angles to the latter's movement in the sleeve 4. To prevent the ears 20 from clenching the plates immovably together, the ears have shoulders indicated at 24 bearing against the upper face of the plate 21 and reduced portions indicated at 25 interlocking with marginal slots in the plate 21. This holds the plate 21 at a fixed interval from the plate 19.

A suitable lateral handle 26 extends from the spindle 15, to sweep a latch plate 27 that has a central aperture with lugs 28 whereby it may be adjustably interlocked with the upper slotted end portion of the bonnet 7. An index member 29 on the handle sweeps a correspondingly indexed portion of the plate 27 while a latch 30 is projected against the notched periphery of the plate by means of a spring 31. The latter is held by a cap 32 screwthreaded over the handle 26. A screw 33 through the cap 32 acts as a stop to so limit the play of the latch 30 that it only allows movement of the handle from a shoulder 34 in the plate 27 to a corresponding shoulder 35. A handle grip 36 incloses the cap 32 and screw stop 33.

In operation the valve is so adjusted that the port through the sleeve is arranged to give the minimum amount of steam for one radiator or for the set of radiators controlled by the valves when the handle is turned against one of the shoulders of the index plate periphery corresponding to closed position. When the handle is moved to the other shoulder the valve is thus opened to supply a maximum amount of steam for the radiators or set of radiators for which it is adjusted. The intermediate index points engaged by the latch give proportionate supplies of steam. If for any reason it is desirable to change the adjustment of the valve, this may be done by unscrewing the screw stop and permitting the latch to recede sufficiently to move completely around the index plate to admit the minimum amount of steam required to supply the radiators for which it is being set. Having determined the zero point in this manner the index plate may be reset correspondingly and the stop adjusted to limit the movement of the handle as before.

In addition to the quick manipulation and ease of adjustment afforded by the construction, the universal slide connections between the sleeve and the stem permit the stem and sleeve to maintain independent alinement in the casing and bonnet without imposing strain upon either part so that the mechanical difficulty of centering the sleeve which is in screwthreaded engagement with the casing in exact axial alinement with the stem which is rotatable in the casing bonnet, is obviated.

Obviously, changes in the details of construction may be made without departing from the spirit of my invention and I do not care to limit myself to any particular form or arrangement of parts.

What I claim is:—

1. A valve comprising a casing having an inlet opening, a sleeve rotatable in the casing provided with a port adapted to be brought into register with the opening, a stem journaled in the casing extending through an opening in the head of the sleeve, a member laterally movable on the stem in one direction, and laterally movable in the head of the sleeve at right angles to the member's movement on the stem and non-rotatably secured to the sleeve, and means for turning the stem.

2. A valve comprising a casing having a lateral inlet opening, a sleeve longitudinally adjustable and rotatable in the casing provided with a port adapted to register with the opening and with a cross slot in its head, a spindle for turning the sleeve journaled in the casing, a plate member non-rotatably secured to the spindle and adapted to move laterally in one direction thereon and in the cross slot of the sleeve, and a plate movable in synchronism with said plate member and coöperating therewith in holding said sleeve relative to said spindle.

3. In a valve having a casing with an inlet opening and a sleeve rotatable and longitudinally adjustable in the casing that controls the opening, a stem journaled in the casing substantially in axial alinement with the sleeve, means operatively connecting the sleeve and stem comprising a plate non-rotatable on the stem, and a plate interlocked with the first plate, the sleeve having a head with cross slot in which the first plate is movable in one direction, and the plates coacting to couple the sleeve to turn with the stem.

In testimony whereof I affix my signature in presence of two witnesses.

JOSEPH P. LAVIGNE.

Witnesses:
C. R. STICKNEY,
ANNA M. DORR.